US009059776B1

(12) United States Patent
Jimenez de Parga et al.

(10) Patent No.: US 9,059,776 B1
(45) Date of Patent: Jun. 16, 2015

(54) INTEGRATED POWER LINE COMMUNICATION ARCHITECTURES FOR POWER ENTRY MODULES

(71) Applicant: Marvell International Ltd., Hamilton (BM)

(72) Inventors: Antonio Jimenez de Parga, Valencia (ES); Jose Luis Gonzalez Moreno, Valencia (ES)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/085,628

(22) Filed: Nov. 20, 2013

Related U.S. Application Data

(60) Provisional application No. 61/731,670, filed on Nov. 30, 2012, provisional application No. 61/731,683, filed on Nov. 30, 2012.

(51) Int. Cl.
*H04B 1/38* (2006.01)
*H04L 5/16* (2006.01)
*H04B 3/30* (2006.01)

(52) U.S. Cl.
CPC .......................................... *H04B 3/30* (2013.01)

(58) Field of Classification Search
USPC ........................................................ 375/222
See application file for complete search history.

(56) References Cited

U.S. PATENT DOCUMENTS

| | | | |
|---|---|---|---|
| 7,391,714 B2 | 6/2008 | Blasco Claret et al. | |
| 8,174,335 B2 | 5/2012 | Poveda Lerma et al. | |
| 8,373,517 B2 | 2/2013 | Poveda Lerma et al. | |
| 2002/0080010 A1* | 6/2002 | Zhang | 340/310.06 |
| 2010/0011228 A1* | 1/2010 | Chen et al. | 713/300 |
| 2012/0074794 A1* | 3/2012 | Morales et al. | 307/147 |
| 2013/0010838 A1 | 1/2013 | Blasco Claret et al. | |

* cited by examiner

Primary Examiner — Tanmay Shah

(57) ABSTRACT

Systems and techniques relating to wireless communications are described. A described system includes an input port configured to receive an alternating current (AC) waveform from a power line that is external to the apparatus; coupling circuitry coupled with the input port; power line communication (PLC) circuitry coupled with the coupling circuitry, configured to use the coupling circuitry to transmit and receive PLC signals via the power line, where the coupling circuitry and the PLC circuitry are electrically exposed to the AC waveform via the input port; a communication port coupled with the PLC circuitry, configured to provide PLC network access via the PLC circuitry; a filter coupled with the input port, configured to remove the PLC signals from the AC waveform and to produce a filtered AC waveform; and an output port coupled with the filter, configured to provide the filtered AC waveform.

31 Claims, 12 Drawing Sheets

INTEGRATED POWER LINE COMMUNICATION ARCHITECTURES FOR POWER ENTRY MODULES

CROSS REFERENCE TO RELATED APPLICATIONS

This disclosure claims the benefit of the priority of U.S. Provisional Application Ser. No. 61/731,670 filed Nov. 30, 2012, and U.S. Provisional Application Ser. No. 61/731,683 filed Nov. 30, 2012. The above-identified applications are incorporated herein by reference in their entirety.

BACKGROUND

Power lines typically provide alternating current (AC) to connected equipment at high-voltages such as 100V or higher, e.g., 110V, 220V, or 240V. However, power lines can also provide a medium for bidirectional communications among connected equipment. Connected equipment can include communication circuitry to transmit and receive power line communication (PLC) signals via the power lines. Connected equipment can include circuitry operated using direct current (DC). Therefore, some connected equipment may require an AC-DC converter, such as a switched-mode power supply (SMPS), to convert AC to DC for internal circuitry. Connected equipment can include a power receptacle such as one in compliance with an International Electrotechnical Commission (IEC) standard such as IEC 60320.

SUMMARY

The present disclosure includes systems and techniques related to power line communications. According to an aspect of the described systems and techniques, an apparatus for power line communications includes an input port configured to receive an alternating current (AC) waveform from a power line that is external to the apparatus; coupling circuitry coupled with the input port; power line communication (PLC) circuitry coupled with the coupling circuitry, configured to use the coupling circuitry to transmit and receive PLC signals via the power line, where the coupling circuitry and the PLC circuitry are electrically exposed to the AC waveform via the input port; a communication port coupled with the PLC circuitry, configured to provide PLC network access via the PLC circuitry; a filter coupled with the input port, configured to remove the PLC signals from the AC waveform and to produce a filtered AC waveform; and an output port coupled with the filter, configured to provide the filtered AC waveform.

These and other implementations can include one or more of the following features. A communication port can include one or more antennas. A communication port can include one or more Ethernet ports. Implementations can include an Ethernet transformer coupled with the PLC circuitry and the Ethernet port. The Ethernet port and at least a portion of the Ethernet transformer can be electrically isolated from AC waveforms. The PLC circuitry can include an analog front end coupled with the coupling circuitry; and a communication controller coupled with the analog front end and the communication port. In some implementations, a communication port can include an Ethernet port coupled with the communication controller via a first transformer; and a coaxial port coupled with the analog front end via a second transformer. The Ethernet port and the coaxial port can be electrically isolated from AC waveforms. The input port can be rated to handle at least a 110V power line. The input port can be rated to handle at least a 220V or 240V power line. The apparatus can be integrated into a power entry module. The input port can include a receptacle for a removable AC power cord, the receptacle being in compliance with IEC 60320.

Implementations can include a switched-mode power supply coupled with the input port, configured to produce a direct current (DC) waveform in accordance with a control signal. Implementations can include a power supply controller coupled with the switched-mode power supply, configured to produce the control signal, and cause the switched-mode power supply to alter switching during a PLC signal reception period via the control signal to reduce or eliminate interference from the switched-mode power supply during the PLC signal reception period. Altering switching can include changing a switching rate, changing a slew rate, or a combination thereof. In some implementations, the control signal causes the switched-mode power supply to cease switching during the PLC signal reception period. The power supply controller can be configured to monitor the DC waveform, and cause the switched-mode power supply to start switching during the PLC signal reception period if a voltage associated with the DC waveform falls below a threshold. In some implementations, the control signal causes the switched-mode power supply to reduce a switching rate during the PLC signal reception period. The power supply controller can be configured to monitor the DC waveform, and cause the switched-mode power supply to increase a switching rate during the PLC signal reception period if a voltage associated with the DC waveform falls below a threshold. In some implementations, PLC circuitry can include an analog front end coupled with the coupling circuitry; and a communication controller coupled with the analog front end and the communication port, configured to control PLC signal transmission and reception, and provide an indication of the PLC signal reception period to the power supply controller. In some implementations, the communication controller can be configured for multiple-in multiple-out (MIMO) communications.

According to another aspect, a described system for power line communications includes circuitry including a network interface and a processor; and a power entry module configured to receive an AC waveform from a power line that is external to the power entry module, provide an output electrical current to the circuitry, and provide PLC network access to the network interface. the power entry module can include an input port configured to receive the AC waveform from the power line; coupling circuitry coupled with the input port; a PLC modem coupled with the coupling circuitry, configured to cause the coupling circuitry to transmit and receive PLC signals via the power line, where the coupling circuitry and the PLC modem are electrically exposed to the AC waveform via the input port; a communication port coupled with the PLC modem, configured to provide the PLC network access; a filter coupled with the input port, configured to remove the PLC signals from the AC waveform and to produce a filtered AC waveform; and an output port coupled with the filter, configured to provide the output electrical current.

These and other implementations can include one or more of the following features. A communication port can include one or more antennas. A communication port can include one or more Ethernet ports. In some implementations, the output electrical current is alternating current. In some implementations, the output electrical current is direct current. A power entry module can include an Ethernet transformer coupled with the PLC modem and the Ethernet port, where the Ethernet port and at least a portion of the Ethernet transformer are electrically isolated from AC waveforms. A PLC modem can include an analog front end coupled with the coupling circuitry; and a communication controller coupled with the analog front end and the communication port. A communication port can include an Ethernet port coupled with the communication controller via a first transformer; and a coaxial port coupled with the analog front end via a second transformer.

The power entry module can include a switched-mode power supply coupled with the input port, configured to produce a DC waveform in accordance with a control signal. The power entry module can include a power supply controller coupled with the switched-mode power supply, configured to produce the control signal, and cause the switched-mode power supply to alter switching during a PLC signal reception period via the control signal to reduce or eliminate interference from the switched-mode power supply during the PLC signal reception period. Altering switching can include suspending switching. Altering switching can include reducing a switching rate. Altering switching can include changing a slew rate. In some implementations, altering switching can include changing a slew rate of a signal driving a transformer of a power supply. In some implementations, the control signal is configured to cause the switched-mode power supply to cease switching during the PLC signal reception period. In some implementations, the power supply controller is configured to monitor the DC waveform, and cause the switched-mode power supply to start switching during the PLC signal reception period if a voltage associated with the DC waveform falls below a threshold. The PLC modem can include an analog front end coupled with the coupling circuitry; and a communication controller coupled with the analog front end and the communication port, configured to control PLC signal transmission and reception, and provide an indication of the PLC signal reception period to the power supply controller.

According to yet another aspect, a described apparatus for power line communications includes a first interface configured to interact with a power line coupler for transmitting and receiving PLC signals on a power line network via an AC power line; an analog front end coupled with the first interface; a power supply controller configured to produce a control signal for controlling a switched-mode power supply (SMPS), the SMPS being configured to produce a DC waveform based on the AC power line and the control signal; a communication controller coupled with the analog front end and the power supply controller, configured to control PLC signal transmission and reception, and provide an indication of a PLC signal reception period to the power supply controller, and a second interface coupled with the communication controller, configured to provide access to the power line network. The power supply controller can be configured to cause the SMPS to alter switching during at least a portion of the PLC signal reception period via the control signal to reduce or eliminate interference from the SMPS during the PLC signal reception period.

These and other implementations can include one or more of the following features. Altering switching can include reducing a switching rate to a lower rate or to a zero rate. Altering switching can include changing a slew rate. In some implementations, the control signal is configured to cause the SMPS to cease switching during the PLC signal reception period. In some implementations, the power supply controller is configured to monitor the DC waveform, and cause the SMPS to start switching during the PLC signal reception period if a voltage associated with the DC waveform falls below a threshold. The communication controller can include a digital baseband processor. The communication controller can include a PLC-based physical (PHY) layer and a medium access control (MAC) layer controller. The apparatus can include an integrated circuit that contains the power supply controller and the communication controller. In some implementations, the control signal is configured to cause the SMPS to transition from a first switching rate to a second switching rate, the second switching rate being slower than the first switching rate. In some implementations, the control signal is configured to cause the SMPS to transition from a first slew rate to a second slew rate, the second slew rate being slower than the first slew rate. The first and second slew rate being associated with a signal driving a transformer of the SMPS. In some implementations, the communication controller can be configured for MIMO communications.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Particular configurations of the technology described in this document can be implemented so as to realize one or more of the following potential advantages. A described PLC architecture can enable PLC circuitry to reside in a primary area of a power entry module which is exposed to AC, thereby allowing a miniaturized PLC modem design. Further, a described PLC architecture can reduce interference to PLC signals based on controlling switching within switched mode power supply. Enabling PLC circuitry to fit inside of a power entry module such as an IEC-compliant power cord receptacle can reduce costs and enable legacy devices to be retrofitted with a PLC-enabled receptacle to provide communication capabilities in addition to a device's power requirements.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
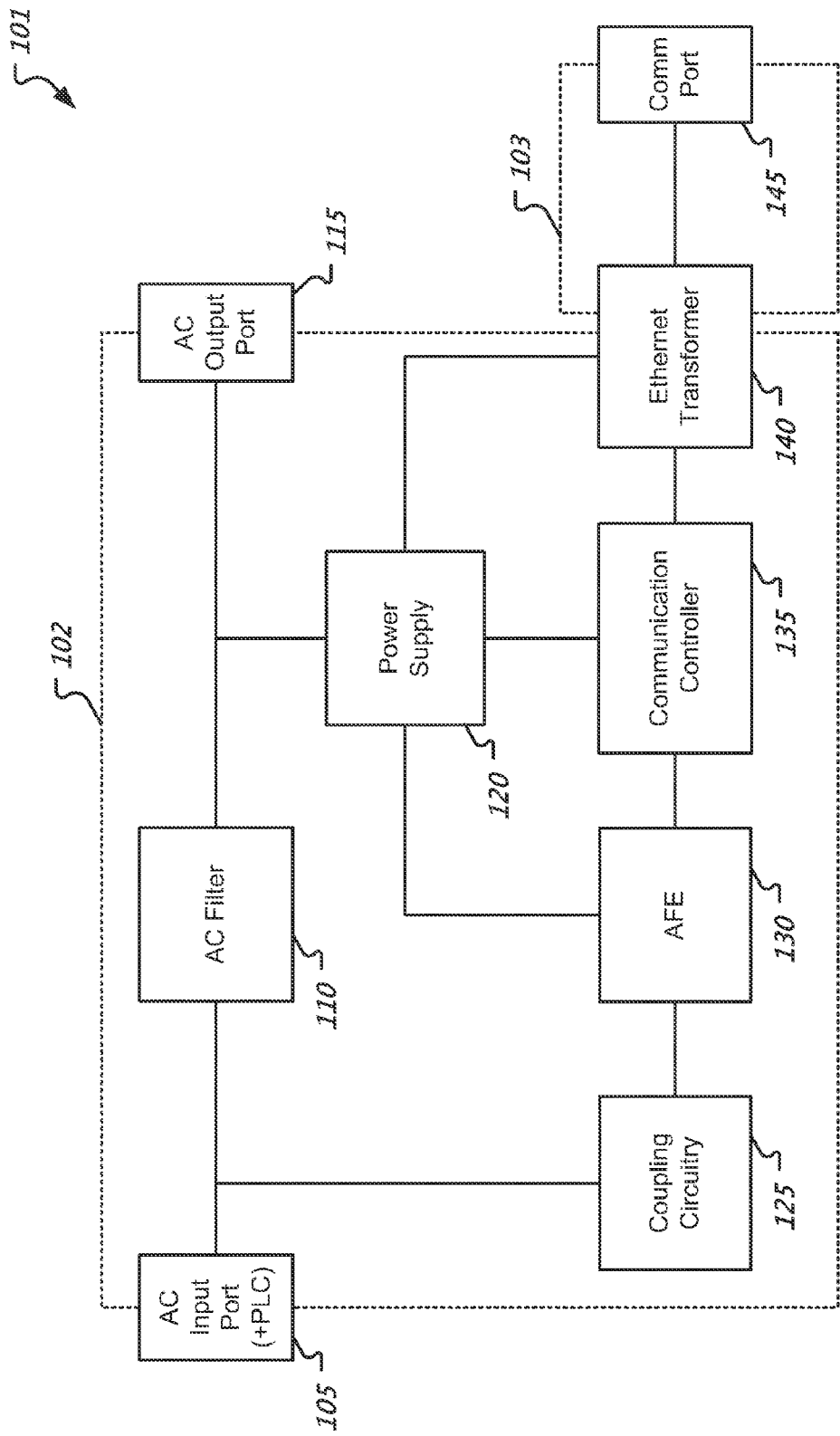
FIG. 1 shows a diagram for an example of a PLC enabled power entry module.

FIG. 1 shows a diagram for an example of a PLC enabled power entry module 101. The module 101 includes an AC input port 105, AC output port 115, and communication port 145. The module 101, including its AC input port 105, can be an IEC 60320 compliant receptacle (an "IEC receptacle") that is configured to accept an IEC compliant AC power cord. In some implementations, the AC input port 105 includes two prongs: a phase prong and a neutral prong. In some implementations, the AC input port 105 includes three prongs: a phase prong, a neutral prong, and an earth prong. AC output port 115 can include two or three wires or terminals to supply an appliance with AC. In some implementations, an appliance can include the module 101. In some implementations, the module 101 can be mechanically attached to a chassis, a printed circuit broad, or both. In some implementations, the AC output port 115 includes leads, where the leads can be soldered or wired to a printed circuit broad.

The module 101 includes an AC filter 110, power supply (PS) 120, coupling circuitry 125, analog front end (AFE) 130, an Ethernet transformer 140, and PLC circuitry such as a communication controller 135. The AC input port 105 can be used to transmit and receive PLC signals, thus, the AC input port 105 also serves as a PLC input/output port. The communication controller 135 can generate digital PLC signals. In some implementations, these digital PLC signals are converted by the AFE 130 into analog PLC signals via a digital-to-analog converter (DAC). The coupling circuitry 125 can inject the analog PLC signals into a power line via the AC input port 105. Further, the coupling circuitry 125 can extract PLC signals from the power line via the AC input port 105. In some implementations, the AFE 130 can include an analog-to-digital converter (ADC) to convert the incoming PLC signals from the coupling circuitry 125 into digital signals for the communication controller 135. In some implementations, one or more high-pass filters are placed between the coupling circuitry 125 and the AFE 130. The coupling circuitry 125 can include an RF transformer and one or more capacitors. In some implementations, the communication controller 135 can include a DAC to provide analog signals to the AFE 130, and a ADC to receive analog signals from the AFE 130.

The communication port 145 can be configured to provide PLC network access to an appliance. The communication controller 135 can provide both physical and logical layer services. For example, the communication controller 135 can include a physical (PHY) layer and medium access control (MAC) layer controller, which can include a PLC based transceiver. In some implementations, the communication controller 135 is configured to bridge a network appliance connected via the communication port 145 with a PLC network over a power line. In some implementations, the communication port 145 includes an Ethernet port that is coupled with the Ethernet transformer 140. In some implementations, the communication controller 135 includes a first PHY/MAC controller for PLC, and a second PHY/MAC controller for Ethernet. In some implementations, communication port 145 can include a receptacle for a plug from a piggyback cable.

The module 101 includes a primary section 102 and a secondary section 103. The primary section 102 is electrically exposed to mains voltage, e.g., high-voltage AC waveform, provided via the AC input port 105. In some implementations, the input port 105 is rated to handle a 110V or higher power line. In some implementations, the input port 105 is rated to handle a 220V power line. The secondary section 103 is electrically isolated from the high-voltage AC waveform. In some implementations, the Ethernet transformer 140 bridges the primary section 102 and the secondary section 103. The Ethernet transformer 140 can include isolation material to electrically isolate the secondary section 103 from the primary section 102, thereby providing the electrical isolation degree required by the relevant safety standards of the country or countries of use. In some implementations, the Ethernet transformer 140 is a part of circuitry that includes optical transceivers arranged to pass signals and provide the electrical isolation via an air gap or other type of gap such as one formed by plastic or fiber optic cabling.

The AC filter 110 can remove PLC signals from an AC waveform, including both incoming and outgoing PLC signals, and produce a filtered AC waveform to the AC output port 115 and the power supply 120. In some implementations, the AC filter 110 can remove disturbances coming from an appliance connected on the output port 115 that may contaminate the PLC signal. The power supply 120 can include an AC/DC converter to provide a DC waveform to internal components such as the AFE 130, communication controller 135, and Ethernet transformer 140. In some implementations, the power supply 120 can supply the DC waveform to external components via a DC output port (not shown).

Figure 2:
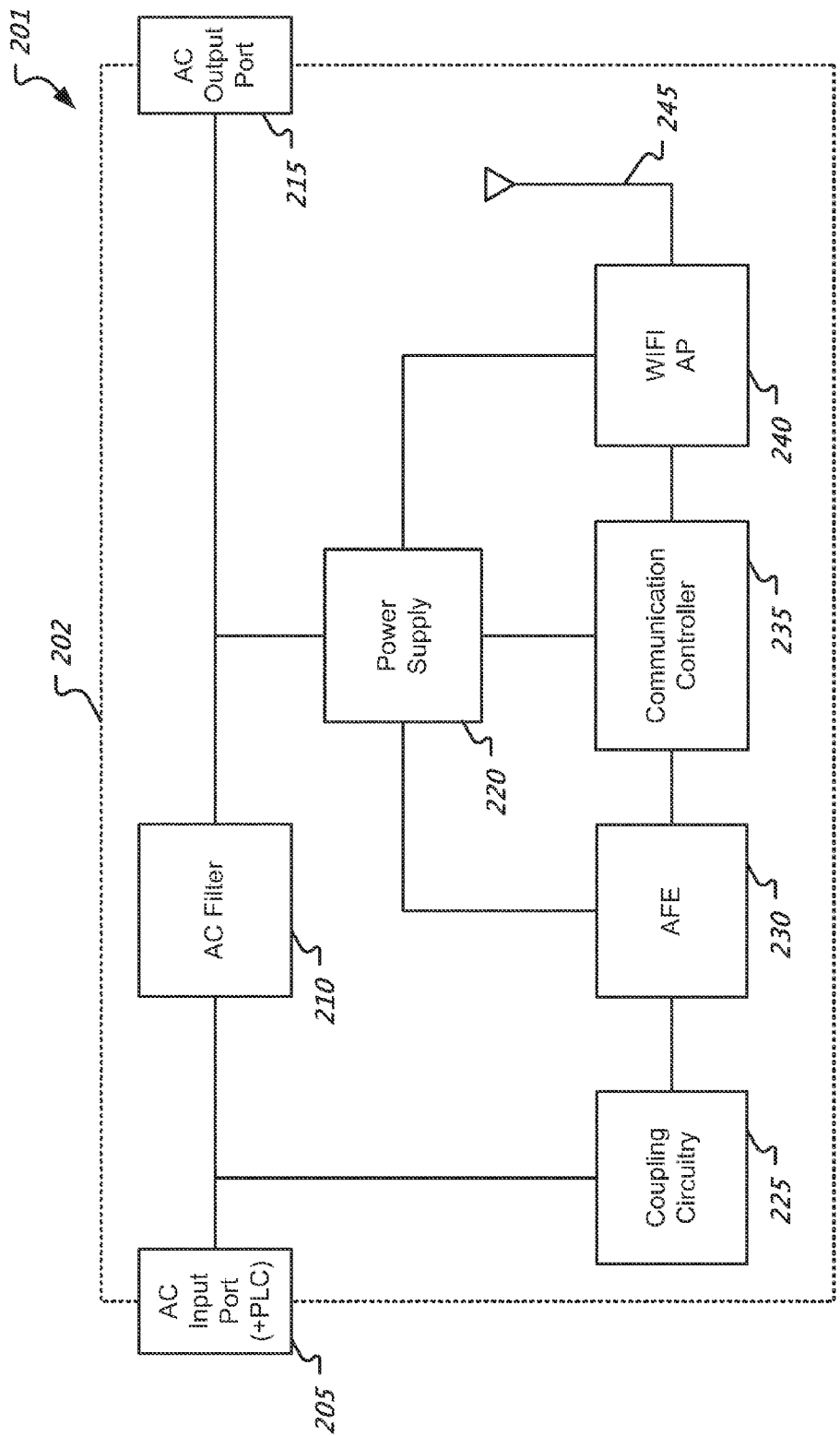
FIG. 2 shows a diagram for an example of a PLC enabled power entry module with a wireless communication port.

FIG. 2 shows a diagram for an example of a PLC enabled power entry module 201 with a wireless communication capability. The module 201 includes an AC input port 205 and an AC output port 215. The module 201 includes an AC filter 210, power supply 220, coupling circuitry 225, AFE 230, communication controller 235, wireless (WIFI) access point (AP) 240, and a communication port such as an antenna 245. In some implementations, the antenna 245 is completely enclosed by a housing structure of the power entry module 201 to provide an all-in-primary solution, which can reduce costs by eliminating transformers that bridge primary and secondary portions. In some implementations, power entry module 201 includes a coaxial communication port to enable the wireless AP 240 to couple with an external antenna.

The module 201 includes a primary section 202 that is electrically exposed to mains voltage, e.g., high-voltage AC waveform, provided via the input port 205. The input port 205 can include a receptacle for a removable AC power cord. In some implementations, the input port 205 is rated to handle a 110V power line. In some implementations, the input port 205 is rated to handle a 220V power line. The power supply 220 can include an AC/DC converter that can convert mains voltage AC into low-voltage DC. The power supply 220 can provide electrical current to various internal components such as AFE 230, communication controller 235, and wireless AP 240. In some implementations, the communication controller 235 includes the wireless AP 240. In some implementations, the wireless AP 240 includes a PHY/MAC controller that is configured for wireless communications such as those based on an IEEE 802.11 standard or Bluetooth standard.

Figure 3:
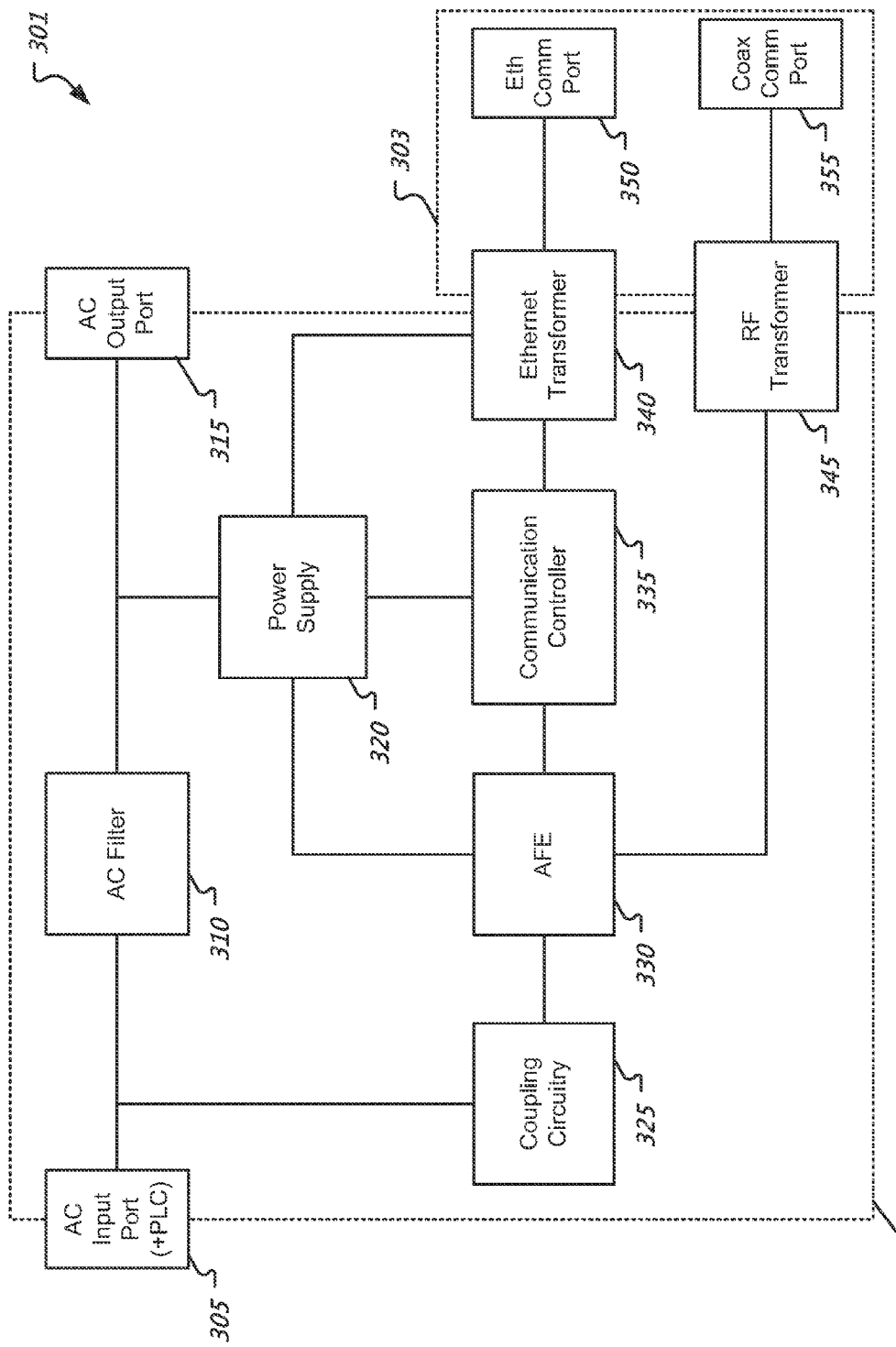
FIG. 3 shows a diagram for an example of a PLC enabled power entry module with dual communication ports.

FIG. 3 shows a diagram for an example of a PLC enabled power entry module 301 with dual communication ports 350, 355. The module 301 includes an AC input port 305, AC output port 315, and communication ports such as an Ethernet communication port 350 and a coaxial communication port 355. The module 301 includes an AC filter 310, power supply 320, coupling circuitry 325, AFE 330, communication controller 335, Ethernet transformer 340, and a radio frequency (RF) transformer 345. Module 301 includes a primary section 302 and a secondary section 303. The primary section 302 is electrically exposed to a high-voltage AC waveform provided via the input port 305. The secondary section 303 is electrically isolated from the high-voltage AC waveform. The Ethernet transformer 340 and the radio frequency (RF) transformer 345 include isolation material to protect their respective communication ports 350, 355, where the isolation material satisfies one or more applicable safety regulations.

The communication controller 335 can include a digital baseband processor. In some implementations, a digital baseband processor is compliant with the G.hn standard. In some implementations, the communication controller 335 can be configured to automatically select the best medium for data transmission, e.g., a PLC network via the AC input port 305 or the coaxial communication port 355. For example, the controller 335 can cause the AFE 330 to provide a data transmission signal to the coupling circuitry 325, the RF transformer 345, or both. Having a coaxial communication port 355 can ease integration with TVs and set-top boxes (STBs) that can include AC and coaxial ports.

PLC systems can use a timing schedule that is synchronously repeated with every AC cycle or every other AC cycle. The timing schedule can include periods, referred to as slots, for transmission, reception, and idle time. A PLC system is more sensitive to power supply noise in the reception periods, than in the transmission or idle periods. Thus, a PLC aware power supply controller can be configured to selectively modify one or more dynamic aspects such as reducing or suspending one or more dynamic aspects of a power supply to reduce power supply noise during the reception periods. For example, a switching aspect, e.g., a switching rate or a slew rate of a current waveform applied to a transformer, of an AC/DC switched-mode power supply (SMPS) can be altered, e.g., softened, reduced, or suspended, during the reception periods.

AC/DC SMPS converters, for example, can switch at a frequency between 100 and 200 kHz. The ringing of the switching waveform due to stray capacitance and inductance covers a sizeable portion of the 2-to-20 MHz PLC frequency band. Keeping PLC reception clean from noise may require a complex design and/or additional component costs, and may present difficulties when producing a miniaturized design. Taking control of the power supply's switching can help to improve power consumption in standby mode. Further, controlling the power supply to alter switching during PLC reception periods can reduce the impact of noise from AC/DC converter on a PLC modem, and can enable miniaturized designs, such as ones that can fit into an IEC compliance receptacle. Altering switching during PLC reception periods can include suspending switching, softening switching, reducing a rate of switching, or a combination thereof. Other types of alterations are possible. In some implementations, softening switching can include changing a slew rate of a signal driving a transformer of a power supply.

A PLC enabled power entry module, for example, can include a SMPS and a PLC aware power supply controller configured to control switching within the SMPS. In some implementations, the PLC aware power supply controller can be configured to cause the SMPS to cease switching in selected slots, such as reception (RX) slots, and allow switching in transmission (TX) slots. In some implementations, the PLC aware power supply controller can be configured to cause the SMPS to modify one or more switching parameters in selected slots, such as RX slots, and allow unmodified switching in TX slots. In some implementations, a PLC aware power supply controller can communicate with a SMPS via a communication channel such as a serial bus. Various examples of switching parameters include a switching rate and a slew rate. If a DC voltage of the SMPS falls below a voltage threshold, e.g., a critical level voltage, for maintaining an expected DC output voltage, the power supply controller can resume switching regardless of the slot type. In some implementations, if a DC voltage level falls below the level at which the power monitor issues a reset of the system, the controller can restart switching or change to a switching mode that provides more power without waiting for a control signal from a controller.

In some implementations, a SMPS within a power entry module can provide DC to internal circuitry such as a PLC modem included in the power entry module. In some implementations, the SMPS additionally provides DC to external circuitry. In some implementations, a MAC/PHY controller, within a PLC modem, informs a power supply controller when it should cause the SMPS to cease switching, and the power supply controller can generate a signal to suspend the switching. In some implementations, the power supply controller is integrated with a MAC/PHY controller. In some implementations, the power supply controller is integrated with an AFE. In some implementations, a PLC chipset can include a PLC aware power supply controller and a MAC/PHY controller.

Figure 4:
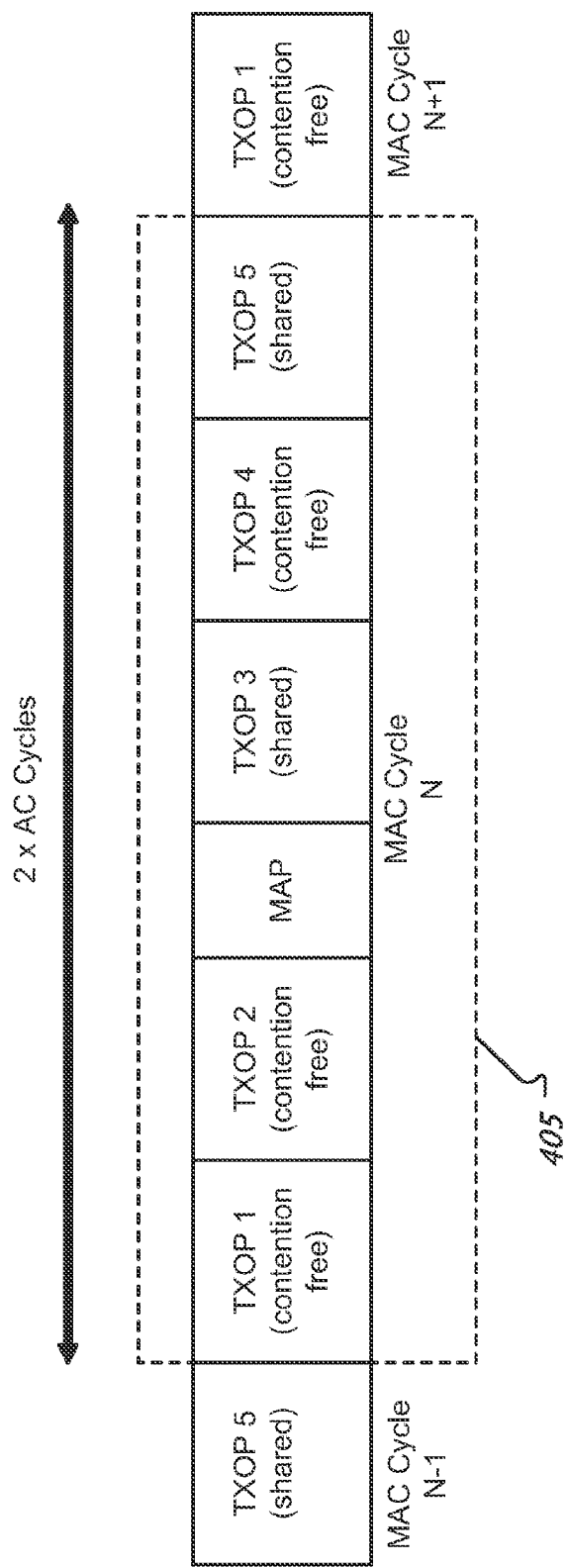
FIG. 4 shows a timing sequence for an example of communication periods associated with power line communications.

FIG. 4 shows a timing sequence for an example of communication periods associated with power line communications. A MAC cycle 405 can span two AC cycles. A duration of an AC cycle is based on a frequency associated with a power line, e.g., 50 Hz or 60 Hz. The MAC cycle 405 can include one or more transmission opportunities (TXOPs). One or more TXOPs within the MAC cycle 405 can be shared among communicating devices based on a contention mechanism during a shared period. One or more TXOPs within the MAC cycle 405 can be assigned to a specific device, thereby creating a contention free period for that device. The MAC cycle 405 can include a Medium Access Plan (MAP) period that contains information on TXOP assignment(s) within one or more MAC cycles. A MAP period can include an encoded signal containing one or more time assignments. Other formats for MAC cycles, than those depicted by FIG. 4, are possible. For example, a MAC cycle can have more or less periods.

Figure 5A:
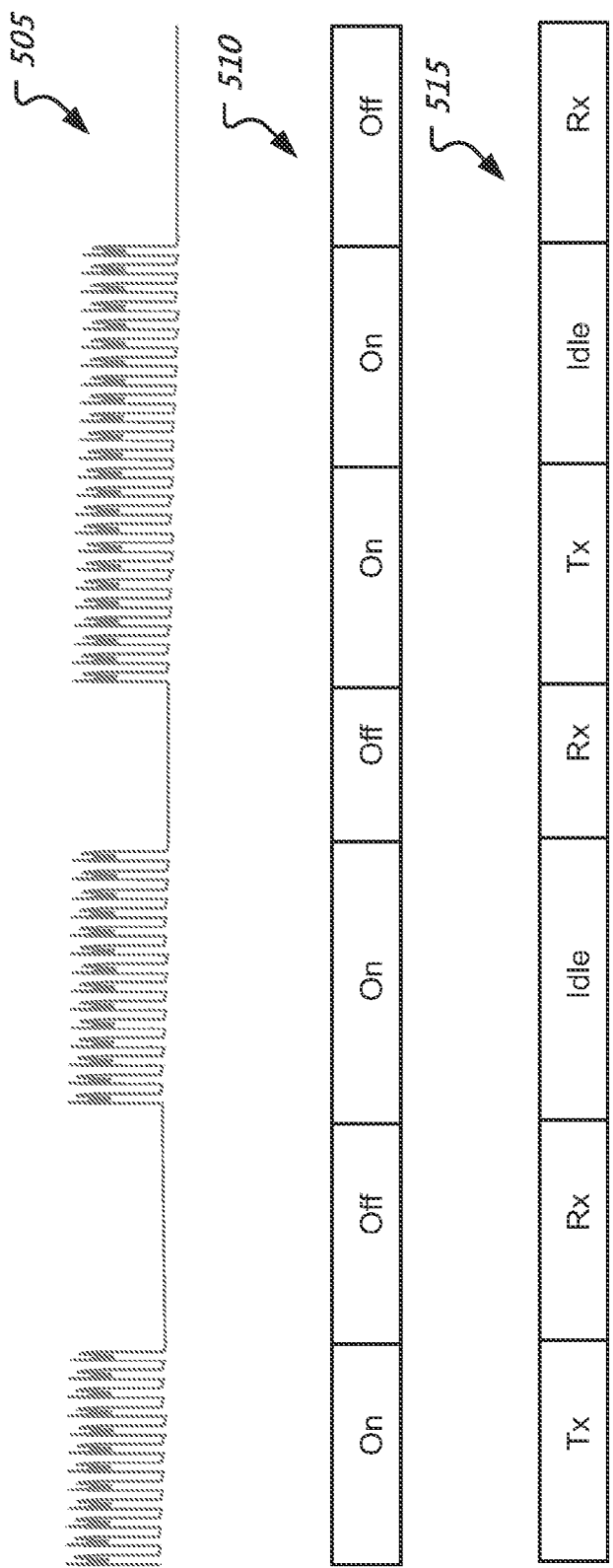
FIGS. 5A and 5B show timing sequences for different examples of controlling the switching of a SMPS during transmission, reception, and idle periods associated with power line communications.

FIG. 5A shows a timing sequence for an example of controlling the switching of a SMPS during transmission, reception, and idle PLC periods. A SMPS can include a switcher that generates its switching activity. In this example, the switcher is in an on-state during the PLC signal TX periods and the idle periods, and is in an off-state during PLC signal RX periods. Communication state sequence 515 includes transmission, reception, and idle PLC periods. Correspondingly, the switch state sequence 510 depicts periods in which the switcher is in the on-state, and periods in which the switcher is in the off-state. Waveform 505 depicts the switching activity of the SMPS across multiple PLC periods that corresponds to the switch state sequence 510. Note that the SMPS switcher can switch on and off during the on-state.

Figure 5B:
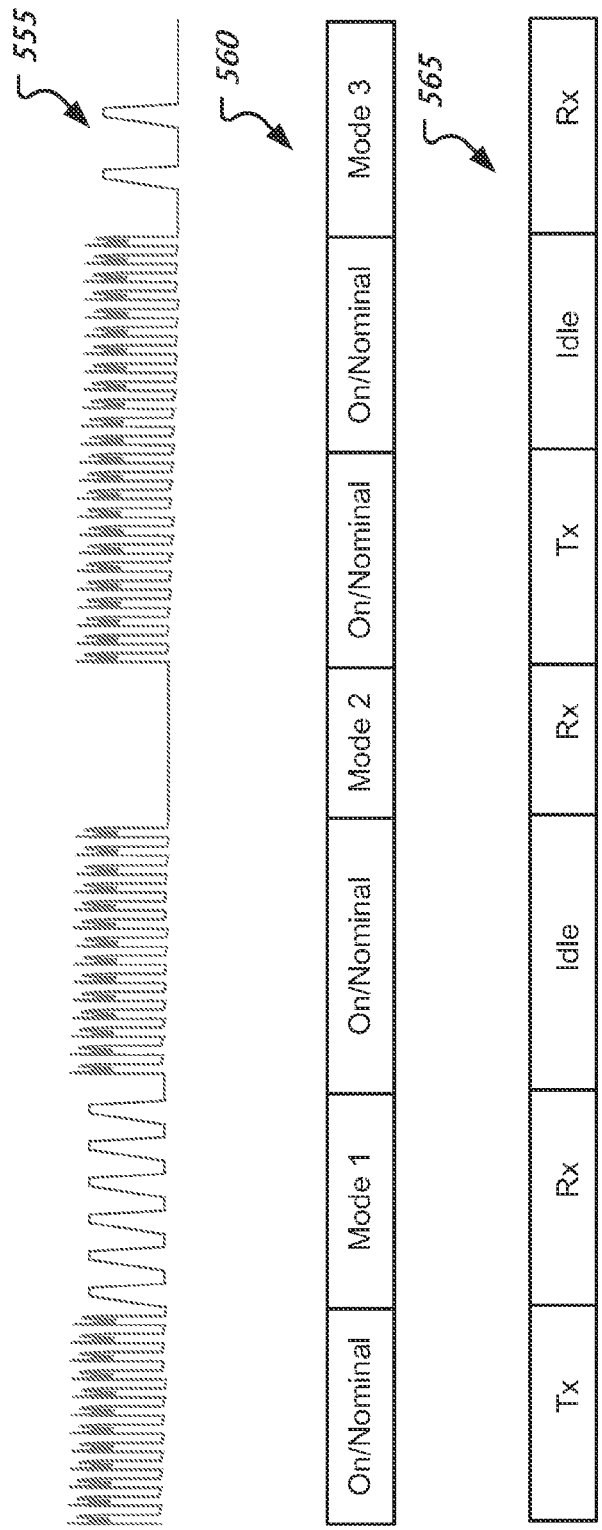

FIG. 5B shows a timing sequence for another example of controlling the switching of a SMPS during transmission, reception, and idle PLC periods. A SMPS can include a switcher that generates its switching activity. In this example, the switcher is in an on-state, called a nominal mode, during the PLC signal TX periods and the idle periods, and is in one of three different modified modes, e.g., mode 1, mode 2, and mode 3, during PLC signal RX periods. Communication state sequence 565 includes transmission, reception, and idle PLC periods. Correspondingly, the switch state sequence 560 depicts periods in which the switcher is in the nominal mode, and periods in which the switcher is in a modified mode. When in the nominal mode, the switcher can switch at a nominal switching rate. Waveform 555 depicts the switching activity of the SMPS across multiple PLC periods that corresponds to the switch state sequence 560. The modified modes include a first mode (mode 1), having a slower switching rate than the nominal switching rate; a second mode (mode 2) having a switching rate of zero, which is the off-state, and a third mode (mode 3) having a slower and/or softer switching rate than the first mode. Other types of modified modes are possible.

Figure 6:
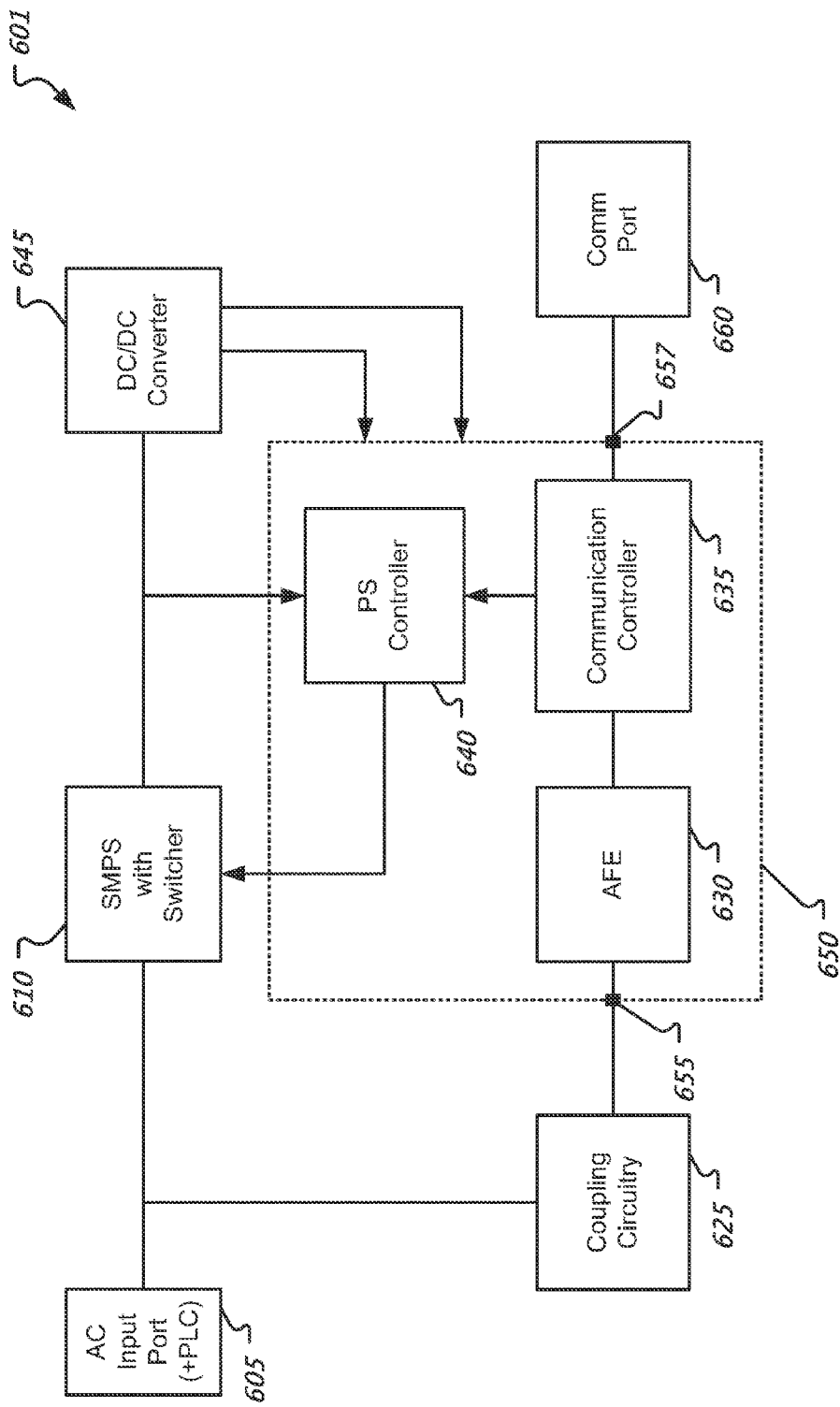
FIG. 6 shows a diagram for an example of a PLC enabled power entry module with a PLC aware SMPS controller.

FIG. 6 shows a diagram for an example of a PLC enabled power entry module 601 with a PLC aware SMPS controller 640. The module 601 includes an AC input port 605, SMPS 610, coupling circuitry 625, AFE 630, communication controller 635, PS controller 640, DC/DC converter 645, and communication port 660. In some implementations, AFE 630, communication controller 635, and PS controller 640 can be a PLC modem chipset 650. The DC/DC converter 645 can provide different voltages to the PLC modem chipset 650 based on a DC output from the SMPS 610.

The PLC modem chipset 650 can include a coupler interface 655 to interact with the coupling circuitry 625 for transmitting and receiving PLC signals via an AC power line. During a PLC reception period, the AFE 630 can be controlled to sample an incoming signal via the coupler interface 655 and provide signal samples to the communication controller 635. In some implementations, the controller 635 performs the sampling. During a PLC transmission period, the AFE 630 can be controlled to produce an analog output signal to the coupler interface 655 based on a digital signal from the communication controller 635. In some implementations, the controller 635 includes a DAC and an ADC, and the AFE 630 is configured to perform signal conditioning. In some implementations, the coupler interface 655 includes an outgoing TX signal interface and an incoming RX signal interface. In some implementations, an interface for TX and RX signals, where the TX and RX signals are multiplexed onto a joint RX/TX interface. In some implementations, the coupler interface 655 includes terminals for 2 to 10 wires. The communication controller 635 can couple with a communication port 660 via a network interface 657 of the PLC modem chipset 650. In some implementations, the coupler interface 655 includes terminals for two writes, where the TX and RX are multiplexed onto these two wires. In some implementations, the coupler interface 655 includes terminals for four wires, e.g., two TX wires and two RX wires. In some implementations, the coupler interface 655 includes terminals for multiple-in multiple-out (MIMO) communications. For example, the coupler interface 655 can provide, for example, two or more pairs of TX wires and two or more pairs of RX wires for a 2×2 MIMO system. In some implementations, the coupler interface 655 can provide wiring for three RX channels and wiring for two TX channels for a 3×2 MIMO system. Other MIMO wiring schemes are possible.

The PS controller 640 can be configured to produce a control signal for controlling the SMPS 610 to reduce or eliminate interference from the SMPS 610 during one or more PLC signal reception periods. The SMPS 610 can be configured to produce a DC waveform in accordance with the control signal. For example, the SMPS 610 can include a switcher that is responsive to the control signal from the PS controller 640. For example, the PS controller 640 can cause the switcher to cease or slow down switching during a PLC signal reception period via the control signal. The communication controller 635 can provide an indication of the PLC signal reception period to the PS controller 640.

In some implementations, the PS controller 640 is configured to monitor a DC waveform from the SMPS 610, and restore switching to a nominal full-power switching during the PLC signal reception period if a voltage associated with the DC waveform falls below a critical level. For example, based on monitoring the SMPS 610, if it is determined that the SMPS 610 will no longer be able to maintain an acceptable DC output voltage, then switching can be resumed to cause the SMPS 610 to draw power from the input port 605 and re-energize a capacitor within the SMPS 610.

In some implementations, two or more sequential PLC reception periods can occur. If the DC waveform from the SMPS 610 is below a critical level at a start of another PLC reception period, then switching is not suspended. However, the PS controller 640 can be configured to suspend switching once the DC waveform from the SMPS 610 is above the critical level by at least a predetermined amount.

In some implementations, the communication controller 635 includes a PHY layer controller and a MAC layer controller for PLC, or a combined PHY/MAC controller for PLC. In some implementations, the communication controller 635 includes a wireless AP controller, such as an AP controller based on an IEEE 802.11 standard or Bluetooth. In some implementations, the communication controller 635 is configured to assign a network address to a device connected via the communication port 660.

Figure 7:
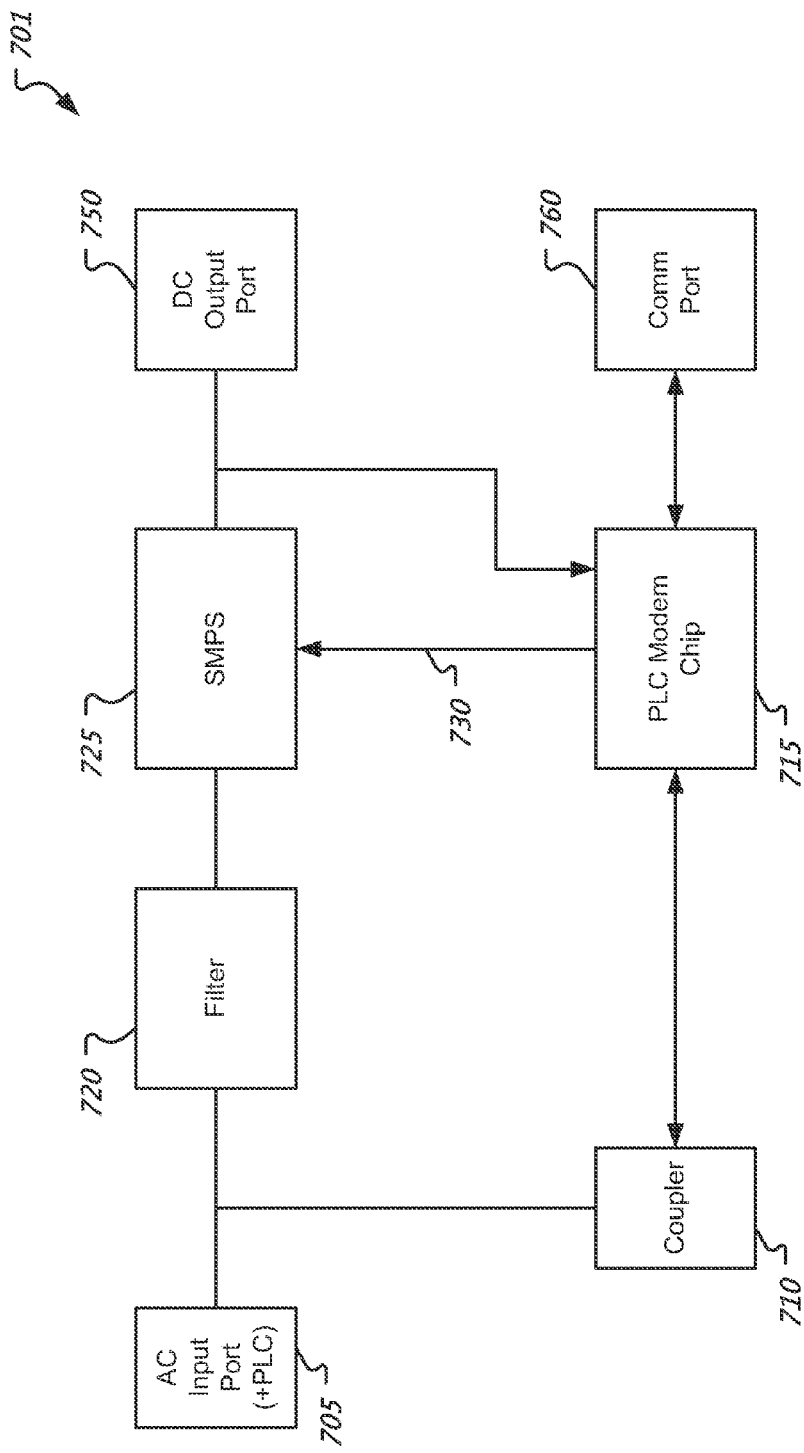
FIG. 7 shows a diagram for another example of a PLC enabled power entry module with a PLC aware SMPS controller.

FIG. 7 shows a diagram for another example of a PLC enabled power entry module 701 with a PLC aware SMPS controller inside of a PLC modem chip 715. The module 701 includes an AC input port 705, coupler 710, filter 720, SMPS 725, PLC modem chip 715, DC output port 750, and communication port 760. The coupler 710 can be configured to convert between high-voltages such as those via the input port 705, and low-voltages from the PLC modem chip 715. In some implementations, the coupler 710 is configured to couple a low-voltage PLC signal onto the AC voltage without converting its amplitude, and the reverse (i.e., decouple). The filter 720 can be configured to remove PLC signals from an AC waveform and provide a filtered AC waveform to the SMPS 725. In some implementations, the filter 720 can remove disturbances coming from the power supply 725. The SMPS 725 can provide a DC waveform to components such as the DC output port 750 and the PLC modem chip 715. The communication port 760 can provide external access to a power line network via the PLC modem chip 715.

The PLC modem chip 715 can include an AFE, PHY/MAC communication controller, and a PLC aware SMPS controller. The PLC modem chip 715 can produce a control signal 730 for the SMPS 725 via an interface, e.g., an output pin of the chip 715. For example, the chip 715 can be configured to cause the SMPS 725 to alter switching during at least a portion of a PLC signal reception period via the control signal 730. The PLC modem chip 715 can monitor a voltage level associated with the SMPS 725 via an interface, e.g., an input pin of the chip 715, and control the control signal 730 based on the voltage level to ensure that the voltage level does not fall below a critical level. In some implementations, power requirements of the PLC modem chip 715 can be satisfied via a DC output of the SMPS 725. In some implementations, power requirements of the PLC modem chip 715 can be satisfied via multiple DC outputs of a DC/DC converter (not shown) coupled with the SMPS 725. In some implementations, the chip 715 includes a Complementary Metal-Oxide-Semiconductor (CMOS) based integrated circuit (IC).

Figure 8:
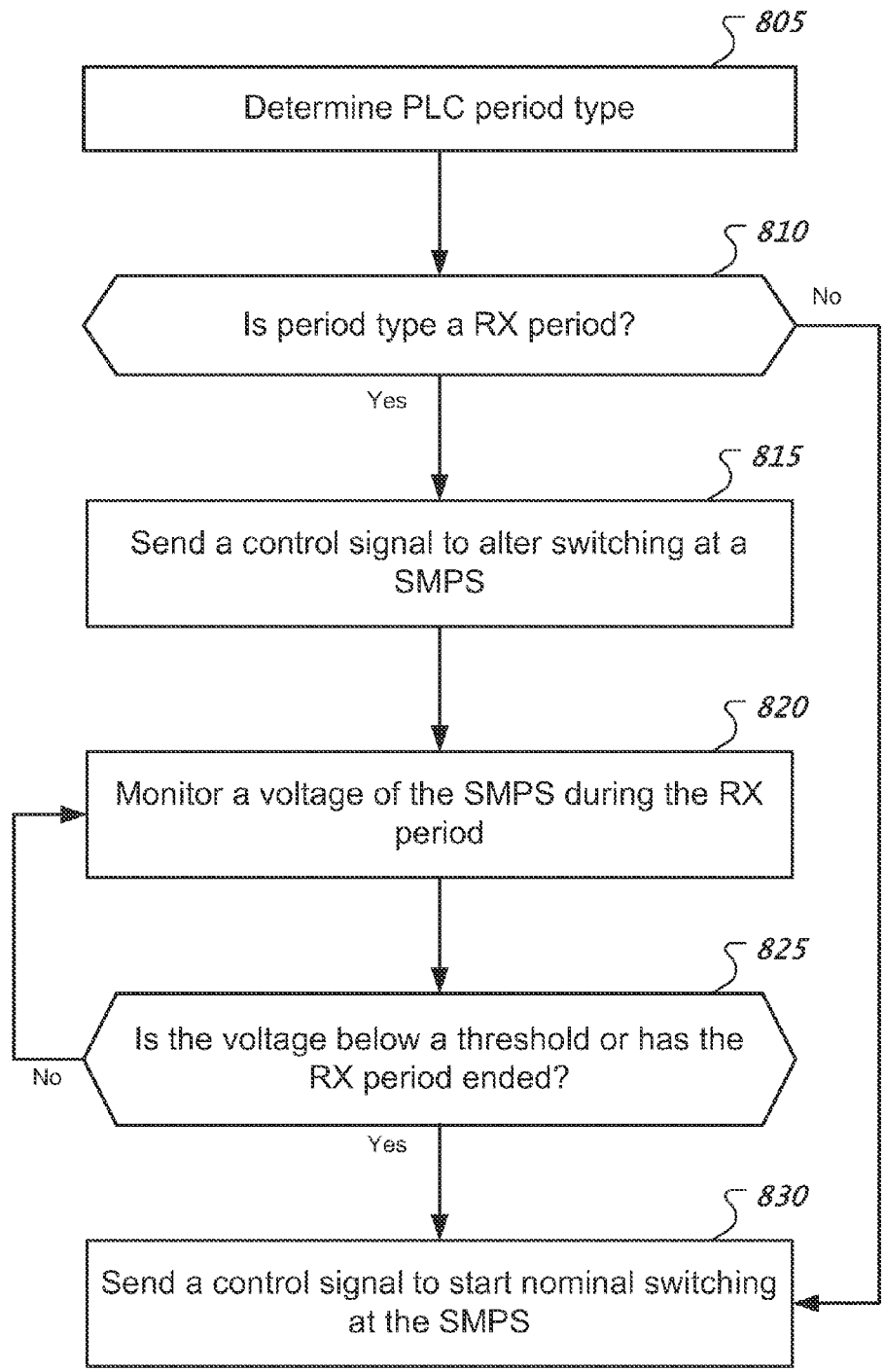
FIG. 8 shows a flowchart for an example of a PLC aware SMPS controller process.

FIG. 8 shows a flowchart for an example of a PLC aware SMPS controller process. At 805, the process determines a PLC period type. At 810, if the period type is not a RX period, then the process continues at 830, where the process sends a control signal to start switching at the SMSP. At 810, if the period type is a RX period, then the process continues at 815. At 815, the process sends a control signal to alter switching at a SMPS. In some implementations, the control signal causes the switching to be suspended. In some implementations, the control signal causes the switching to slow-down, to a rate that is slower than a nominal rate. In some implementations, the control signal causes a change in current slope, switching frequency, or both. Sending a control signal can include transmitting a signal via a serial bus carrying digital data. At 820, the process monitors a voltage of the SMPS during the RX period. At 825, the process determines whether the voltage is below a threshold. Also, at 825, the process determines whether the RX period has or will come to an end within a predetermined period of time. If the voltage is below a threshold or if the RX period has or will come to an end, then at 830, the process sends a control signal to start nominal switching, e.g., switching at a nominal switching rate, at the SMSP.

Figure 9A:
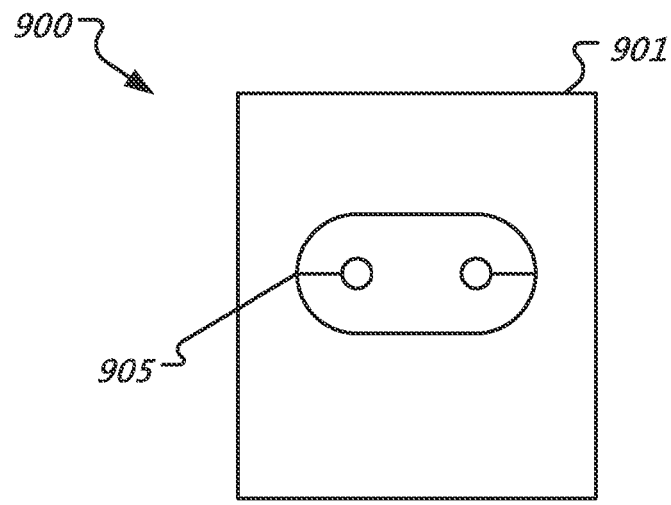
FIGS. 9A and 9B show different views of an example of a housing structure for a power entry module.

FIG. 9A shows a diagram for an example of a front side 901 of a housing structure 900 for a power entry module. The front side 901 of the housing structure 900 includes an AC input port such as a power cord receptacle 905. In this example, the power cord receptacle 905 includes two prongs. The housing structure 900, including the power cord receptacle 905, can be rated for mains voltages such as 100V or higher, e.g., 110V, 220V, or 240V. In some implementations, the power cord receptacle 905 is in compliance with an inlet style specified by IEC 60320.

Figure 9B:
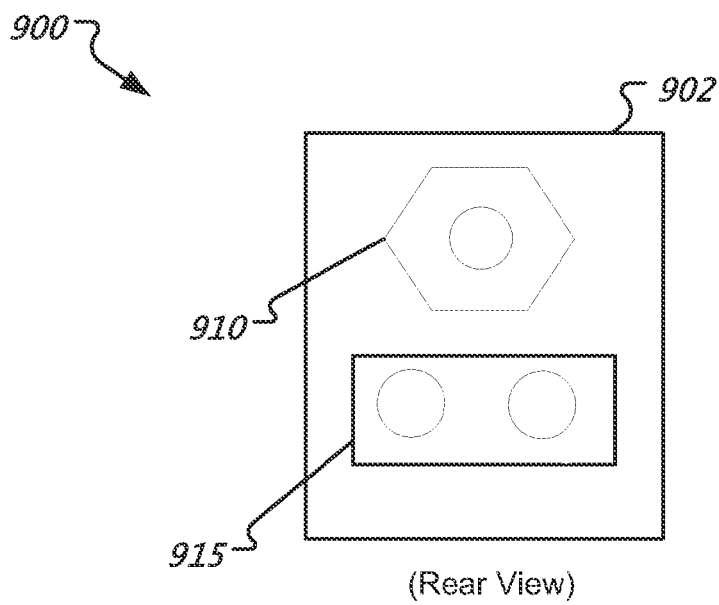

FIG. 9B shows a diagram for an example of a rear side 902 of the housing structure 900 for the power entry module of FIG. 9A. The rear side 902 of the housing structure 900 includes a communication port such as a coaxial cable connector 910 and AC output port 915 containing at least two power terminals. In general, a communication port and AC output port can be located on same or different sides of the housing structure 900, and can be located on any side of the housing structure 900. In some other implementations, the output port 970 can provide DC.

Figure 9C:
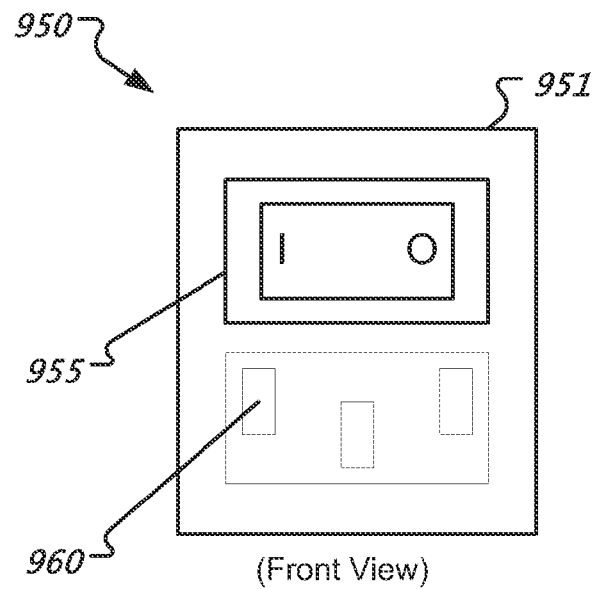
FIGS. 9C and 9D show different views of another example of a housing structure for a power entry module.

FIG. 9C shows a diagram for another example of a front side 951 of a housing structure 950 for a power entry module. The front side 951 of the housing structure 950 includes a power switch 955 and an AC input port such as a power cord receptacle 960. In this example, the power cord receptacle 960 includes three prongs. The housing structure 950, including the power cord receptacle 960, can be rated for mains voltages such as 100V or higher, e.g., 110V, 220V, or 240V. In some implementations, the power cord receptacle 960 is in compliance with an inlet style specified by IEC 60320.

Figure 9D:
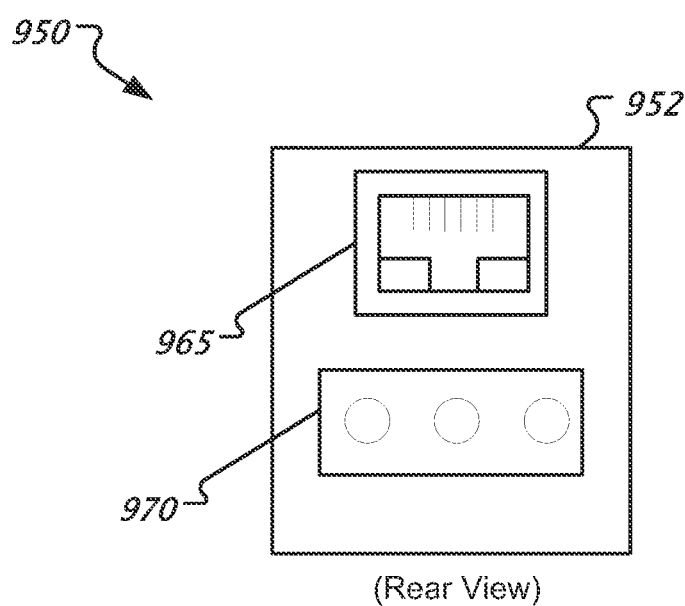

FIG. 9D shows a diagram for an example of a rear side 952 of the housing structure 950 for the power entry module of FIG. 9C. The rear side 952 of the housing structure 950 includes a communication port such as an Ethernet port 965 and an output port 970 containing multiple power terminals. In some implementations, the output port 970 can provide AC. In some other implementations, the output port 970 can provide DC. For example, the output port 970 can include one set of terminals to provide DC at a first voltage and another set of terminals to provide DC at a second, different voltage.

In some implementations, the housing structures 900, 950 are in compliance with IEC 60320. In some implementations, the housing structures 900, 950 can be configured to accommodate electronic parts such as an electromagnetic interference (EMI) filter such as an AC filter. In some implementations, the housing structures 900, 950 can be configured to accommodate an AC filter and a PLC modem to provide a convenient way to network appliances such as audio-video (AV) appliances.

Figure 10:
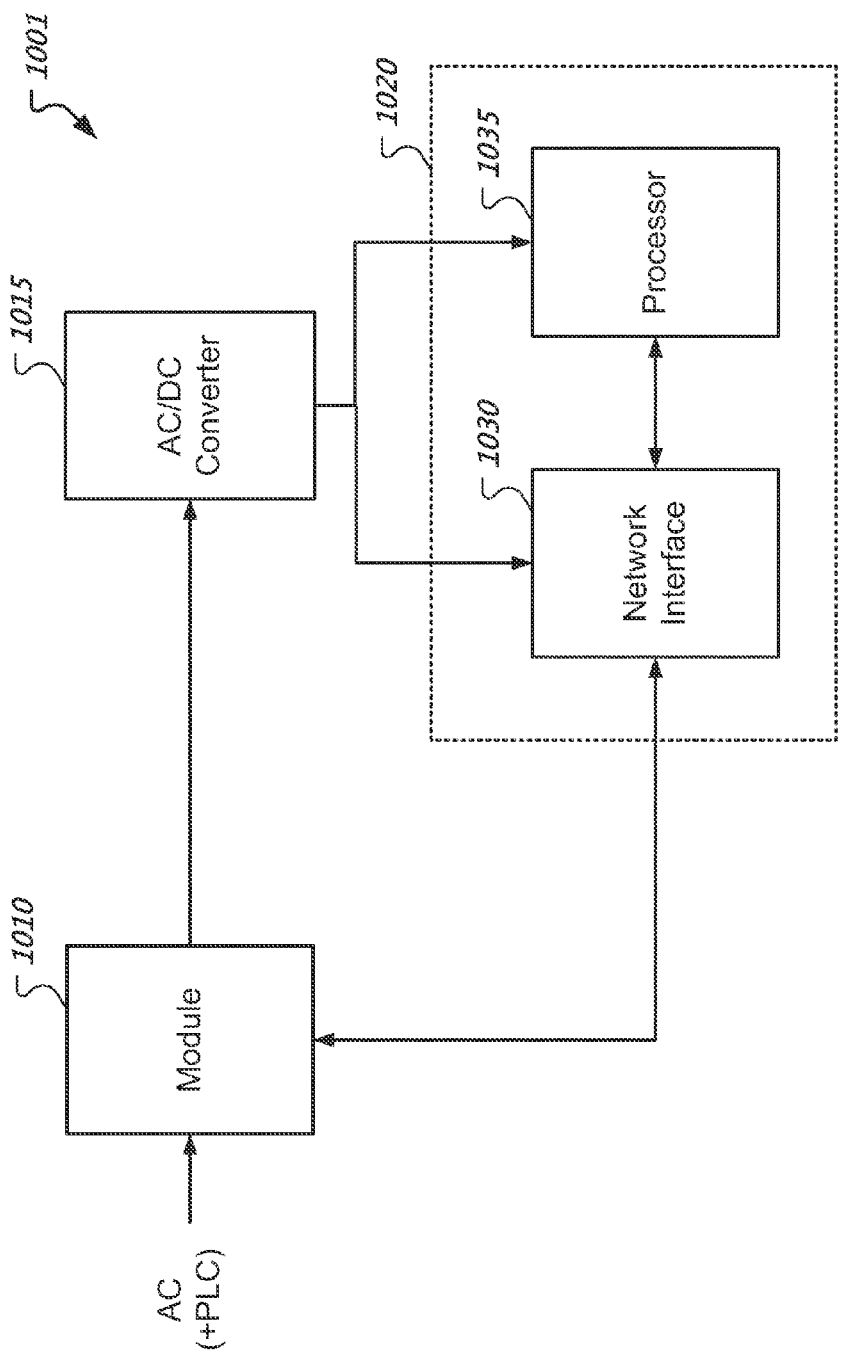
FIG. 10 shows a diagram for an example of a system that includes a PLC enabled power entry module.

FIG. 10 shows a diagram for an example of a system 1001 that includes a PLC enabled power entry module 1010. The system 1001 includes a PLC enabled power entry module 1010, AC/DC converter 1015, and principle circuitry 1020. The principle circuitry 1020 includes a network interface 1030 and a processor 1035. In some implementations, the network interface 1030 is communicatively coupled with a communication port of the module 1010. In some implementations, the network interface 1030 communicates via a communication port of the module 1010 using a wireline standard such as Ethernet or a wireless standard such as a Bluetooth or an IEEE 802.11 wireless standard. In some implementations, the power entry module 1010 includes the AC/DC converter 1015.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:
1. An apparatus comprising:
   an input port configured to receive an alternating current (AC) waveform from a power line that is external to the apparatus;
   coupling circuitry coupled with the input port;
   power line communication (PLC) circuitry coupled with the coupling circuitry, configured to use the coupling circuitry to transmit and receive PLC signals via the power line, wherein the coupling circuitry and the PLC circuitry are electrically exposed to the AC waveform via the input port;

a communication port coupled with the PLC circuitry, configured to provide PLC network access via the PLC circuitry;

a filter coupled with the input port, configured to remove the PLC signals from the AC waveform and to produce a filtered AC waveform; and a power supply coupled with the filter to receive the filtered AC waveform, the power supply configured to produce a direct current (DC) waveform in accordance with a control signal; and a power supply controller coupled with the power supply, the power supply controller configured to produce the control signal, and cause the power supply to change modes during a PLC signal reception period via the control signal to reduce or eliminate interference from the power supply during the PLC signal reception period.

2. The apparatus of claim 1, wherein the communication port comprises an Ethernet port.

3. The apparatus of claim 2, comprising:
an Ethernet transformer coupled with the PLC circuitry and the Ethernet port, wherein the Ethernet port and at least a portion of the Ethernet transformer are electrically isolated from AC waveforms.

4. The apparatus of claim 1, wherein the communication port comprises an antenna.

5. The apparatus of claim 1, wherein the PLC circuitry comprises:
an analog front end coupled with the coupling circuitry; and
a communication controller coupled with the analog front end and the communication port.

6. The apparatus of claim 5, wherein the communication port comprises:
an Ethernet port coupled with the communication controller via a first transformer; and
a coaxial port coupled with the analog front end via a second transformer.

7. The apparatus of claim 1, wherein the input port is rated to handle at least a 110V power line.

8. The apparatus of claim 1, wherein the apparatus is integrated into a power entry module.

9. The apparatus of claim 1, wherein the input port comprises a receptacle for a removable AC power cord, the receptacle being in compliance with IEC 60320.

10. The apparatus of claim 1, wherein the power supply is a switched-mode power supply, wherein the power supply controller is configured to cause the switched-mode power supply to alter switching during the PLC signal reception period via the control signal to reduce or eliminate interference from the switched-mode power supply during the PLC signal reception period.

11. The apparatus of claim 10, wherein the control signal causes the switched-mode power supply to cease switching during the PLC signal reception period, and wherein the power supply controller is configured to monitor the DC waveform, and cause the switched-mode power supply to start switching during the PLC signal reception period if a voltage associated with the DC waveform falls below a threshold.

12. The apparatus of claim 10, wherein the PLC circuitry comprises:
an analog front end coupled with the coupling circuitry; and
a communication controller coupled with the analog front end and the communication port, configured to control PLC signal transmission and reception, and provide an indication of the PLC signal reception period to the power supply controller.

13. A system comprising:
circuitry comprising a network interface and a processor; and
a power entry module configured to receive an alternating current (AC) waveform from a power line that is external to the power entry module, provide an output electrical current to the circuitry, and provide power line communication (PLC) network access to the network interface, wherein the power entry module comprises:
an input port configured to receive the AC waveform from the power line;
coupling circuitry coupled with the input port;
a PLC modem coupled with the coupling circuitry, configured to cause the coupling circuitry to transmit and receive PLC signals via the power line, wherein the coupling circuitry and the PLC modem are electrically exposed to the AC waveform via the input port;
a communication port coupled with the PLC modem, configured to provide the PLC network access;
a filter coupled with the input port, configured to remove the PLC signals from the AC waveform and to produce a filtered AC waveform;
a power supply coupled with the filter to receive the filtered AC waveform, the power supply configured to produce a direct current (DC) waveform in accordance with a control signal; and
a power supply controller coupled with the power supply, the power supply controller configured to produce the control signal, and cause the power supply to alter its operation during a PLC signal reception period via the control signal to reduce or eliminate interference from the power supply during the PLC signal reception period.

14. The system of claim 13, wherein the communication port comprises an Ethernet port.

15. The system of claim 14, wherein the power entry module comprises:
an Ethernet transformer coupled with the PLC modem and the Ethernet port, wherein the Ethernet port and at least a portion of the Ethernet transformer are electrically isolated from AC waveforms.

16. The system of claim 13, wherein the communication port comprises an antenna.

17. The system of claim 13, wherein the PLC modem comprises:
an analog front end coupled with the coupling circuitry; and
a communication controller coupled with the analog front end and the communication port.

18. The system of claim 17, wherein the communication port comprises:
an Ethernet port coupled with the communication controller via a first transformer; and
a coaxial port coupled with the analog front end via a second transformer.

19. The system of claim 13, wherein the input port is rated to handle at least a 110V power line.

20. The system of claim 13, wherein the input port comprises a receptacle for a removable AC power cord, the receptacle being in compliance with IEC 60320.

21. The system of claim 13, wherein the power supply is a switched-mode power supply, and
wherein the power supply controller is configured to cause the switched-mode power supply to alter switching during the PLC signal reception period via the control signal to reduce or eliminate interference from the switched-mode power supply during the PLC signal reception period.

22. The system of claim 21, wherein the control signal is configured to cause the switched mode power supply to cease switching during the PLC signal reception period, and wherein the power supply controller is configured to monitor the DC waveform, and cause the switched mode power supply to start switching during the PLC signal reception period if a voltage associated with the DC waveform falls below a threshold.

23. The system of claim 21, wherein the PLC modem comprises:
an analog front end coupled with the coupling circuitry; and
a communication controller coupled with the analog front end and the communication port, configured to control PLC signal transmission and reception, and provide an indication of the PLC signal reception period to the power supply controller.

24. The system of claim 13, wherein the output electrical current is alternating current.

25. The system of claim 13, wherein the output electrical current is direct current.

26. An apparatus comprising:
a first interface configured to interact with a power line coupler for transmitting and receiving power line communication (PLC) signals on a power line network via an alternating current (AC) power line;
an analog front end coupled with the first interface;
a power supply controller configured to produce a control signal for controlling a switched-mode power supply (SMPS), the SMPS being configured to produce a direct current (DC) waveform based on the AC power line and the control signal;
a communication controller coupled with the analog front end and the power supply controller, configured to control PLC signal transmission and reception, and provide an indication of a PLC signal reception period to the power supply controller, wherein the power supply controller is configured to cause the SMPS to alter switching during at least a portion of the PLC signal reception period via the control signal to reduce or eliminate interference from the SMPS during the PLC signal reception period; and
a second interface coupled with the communication controller, configured to provide access to the power line network.

27. The apparatus of claim 26, wherein the control signal is configured to cause the SMPS to cease switching during the PLC signal reception period, and wherein the power supply controller is configured to monitor the DC waveform, and cause the SMPS to start switching during the PLC signal reception period if a voltage associated with the DC waveform falls below a threshold.

28. The apparatus of claim 26, wherein the communication controller comprises a PLC-based physical (PHY) layer and a medium access control (MAC) layer controller.

29. The apparatus of claim 26, wherein the apparatus comprises an integrated circuit that contains the power supply controller and the communication controller.

30. The apparatus of claim 26, wherein the control signal is configured to cause the SMPS to transition from a first switching rate to a second switching rate, the second switching rate being slower than the first switching rate.

31. The apparatus of claim 26, wherein the control signal is configured to cause the SMPS to transition from a first slew rate to a second slew rate, the second slew rate being slower than the first slew rate.

\* \* \* \* \*